Patented Sept. 3, 1935

2,012,993

UNITED STATES PATENT OFFICE 2,012,993

PREPARATION OF ESTERS

Per K. Frolich, Elizabeth, N. J., assignor to Standard Oil Development Company, a corporation of Delaware No Drawing. Application December 21, 1931,
Serial No. 582,505

23 Claims. (Cl. 260—106)

This invention relates to the manufacture of valuable oxygenated organic products including alcohols, aldehydes, acids and esters by a catalytic process from carbon monoxide and hydrogen, lower alcohols or other oxygenated organic products and more specifically to the production of esters from lower alcohols.

It is known from the work of Sabatier and others that alcohols may readily be dehydrogenated by the use of suitable catalysts at elevated temperatures to yield aldehydes. It is likewise known that two molecules of the aldehyde thus formed may condense to form an ester. Processes of this nature for the production of esters by dehydrogenation and condensation of alcohols have been described in the patent and other literature. According to such processes the alcohol is passed at atmospheric or elevated pressure and at a temperature of about 250 to 500° C. over a dehydrogenation catalyst and a product containing a substantial amount of the corresponding ester is obtained. A disadvantage of such processes is that a large proportion of the reacting alcohol is used in side reactions with formation of by-products which may be undesirable in a process designed primarily for the production of esters. One such by-product is usually a relatively large amount of higher alcohols, particularly when the process is conducted at elevated pressures.

It has now been found that the extent of this side reaction leading to the production of higher alcohols may be greatly diminished and in some instances almost completely eliminated, if the reaction is conducted in the presence of an effective proportion of water. This invention will be clearly understood from the following example:

Pass a mixture containing water and ethyl alcohol in a molal ratio of 2 to 1 over a dehydrogenation catalyst such as copper, at a temperature of 400° C. and a pressure of about 200 atmospheres. Promoted dehydrogenation catalysts, such as copper promoted by the addition of difficultly reducible oxides, are especially suitable for this process. The product withdrawn will contain a large proportion of ethyl acetate with a minimum amount of butyl alcohol formation.

The above reaction may also be conducted at atmospheric pressure. However, since pressure counteracts the loss of valuable materials by decomposition to gaseous products, it permits the use of a higher temperature of operation which in turn accelerates the conversion rate. For this reason pressures in excess of atmospheric and even up to about 300 atmospheres are preferred.

It is preferred to operate at the lowest temperature which can be employed without undue sacrifice of speed of conversion in order to suppress the formation of gaseous decomposition products. Temperatures of about 250 to 500° C. may be used, though the preferred operating range is at temperatures of about 300 to 450° C. The temperatures and pressures should be so adjusted that the reaction is conducted substantially completely in vapor phase and should generally correspond within the range stated, although the optimum conditions for any apparatus and catalyst are best determined by experiment. The molal ratio of water to alcohol may vary within wide limits, and is preferably above 0.1 to 0.5 or 1.0. The upper limit is set chiefly by economic considerations and is usually 3.0 to 5.0, although higher ratios may be used. The lower pure aliphatic alcohols such as methyl, ethyl, propyl, butyl, isobutyl, and the like may be used either alone, in which case esters corresponding to the alcohol are secured, or in mixtures, in which case mixed esters are obtained.

Dehydrogenation catalysts in general, and especially the catalysts ordinarily used for the dehydrogenation of alcohols, are suitable for this process. Although it is known to the art that a certain amount of selectivity may be obtained by varying the type of catalyst employed, it should be noted that the addition of water in regulated proportions greatly aids the selective production of esters, even when the most highly selective dehydrogenation catalysts are used, and that this invention is not limited to the use of any particular dehydrogenation catalyst.

The operation for production of esters may be conducted in the presence of hydrogen in addition to the water vapor and the addition of hydrogen is especially advantageous when the operation is conducted in the upper range of temperatures and pressures, in which event it appears to aid in suppressing undesirable side reactions resulting in the formation of gaseous decomposition products and heavy polymers. The partial pressure of hydrogen should be kept low, however, to diminish its retarding effect on the formation of esters and in the event of hydrogen formation due to side reactions it may be desirable to withdraw hydrogen from the system before recirculation of the water and unreacted alcohol. This may be readily accomplished by cooling and condensing the product, bleeding off a part or all of the fixed gases, and recycling the desired portions of the liquid product.

While the presence of hydrogen, in the absence of water vapor, generally favors the production of higher alcohols, it has been found that the addition of water to a mixture of methanol and hydrogen used in a process for the production of higher alcohols reduces by 90% the yield of higher alcohols and increases ten-fold the production of aldehydes as compared with the yields obtained from a mixture of methanol and hydrogen alone. The aldehydes may be readily converted into esters by known methods.

This invention also relates to the production of methanol and higher alcohols, esters and other oxygenated organic products from mixtures of hydrogen and carbon monoxide by known catalytic syntheses. Water vapor may be added to the products obtained from such a synthesis with or without separation and removal of fixed gases from the normally liquid compounds produced, and the mixture may then be passed over suitable dehydrogenation catalysts to increase the yield of esters. Water vapor may also be added during the reaction of hydrogen and carbon monoxide to selectively favor the production of esters.

This invention is not to be limited to any illustrative examples or theories of the operation of my process, but only by the following claims in which I wish to claim all novelty insofar as the prior art permits.

I claim:

1. The process for producing oxygenated organic compounds, which comprises heating under superatmospheric pressure materials of the class consisting of primary alcohols and substances capable of synthetically forming same, in the presence of a dehydrogenation catalyst, in the presence of an amount of water at least sufficient to greatly retard formation of higher alcohols, and in the absence of air.

2. Process according to claim 1, which is carried out in the presence of hydrogen.

3. A continuous process for the production of oxygenated organic compounds, which comprises continuously passing materials of the class consisting of primary alcohols and substances capable of synthetically forming same, with an amount of water at least sufficient to greatly retard formation of higher alcohols, over a dehydrogenation catalyst at a temperature of 250 to 500° C. and at a pressure substantially above atmospheric, continuously withdrawing reaction products consisting chiefly of aldehydes and esters and continuously withdrawing at least part of the fixed gases in the product and recycling the desired portions of the liquid product.

4. Process for the production of oxygenated organic compounds, which comprises heating materials of the class consisting of primary alcohols and substances capable of synthetically forming same with at least an equal amount of water in the presence of a dehydrogenation catalyst and at a pressure substantially above atmospheric.

5. A process for the production of oxygenated organic compounds, which comprises heating materials of the class consisting of primary alcohols and substances capable of synthetically forming same, with an amount of water at least sufficient to greatly retard formation of higher alcohols, in the presence of a dehydrogenation catalyst at superatmospheric pressure.

6. The process of treating primary alcohols, which comprises heating said alcohols with substantially more than 0.1 mol of water in the presence of a dehydrogenation catalyst at superatmospheric pressure.

7. A process for the production of oxygenated organic compounds consisting chiefly of aldehydes and esters, which comprises heating carbon monoxide and hydrogen with water in the presence of a dehydrogenation catalyst at superatmospheric pressure.

8. A catalytic process for the production of esters from alcohols comprising heating a primary alcohol and a substantial amount of water at superatmospheric pressure in the presence of a dehydrogenation catalyst the amount of water added being sufficient to at least greatly diminish production of higher alcohols.

9. Process according to claim 8, in which the molal ratio of water used is at least 0.5.

10. A catalytic process for the production of esters from alcohols comprising heating a primary alcohol with a substantial amount of water and hydrogen at superatmospheric pressure over a dehydrogenation catalyst the amount of water added being sufficient to at least greatly diminish production of higher alcohols.

11. A catalytic process for the production of esters from alcohols comprising continuously passing a mixture of a substantial amount of water and primary alcohol at superatmospheric pressure and temperature over a dehydrogenation catalyst, the molal ratio of water to alcohol being substantially above 0.1, and withdrawing a product comprising a large proportion of esters.

12. Process according to claim 11 in which the molal ratio of water to alcohol is between the limits of 0.5 and 5.

13. Process according to claim 11 in which the molal ratio of water to alcohol is between the limits of 1 and 3.

14. Process according to claim 11 in which the water-alcohol mixture is passed at a pressure between 1 and 300 atmospheres over the catalyst.

15. Process according to claim 11 in which the catalytic reaction is conducted at a temperature of about 300 to 450° C.

16. Process according to claim 11 in which hydrogen is added to the alcohol-water mixture.

17. Process for the production of oxygenated organic compounds comprising passing a mixture of a primary alcohol and water over a dehydrogenation catalyst at a temperature of about 300 to about 450° C. and a superatmospheric pressure up to 300 atmospheres with a water-alcohol molal ratio of about 0.5 to 5, withdrawing a reaction product and separating an ester therefrom.

18. In the process for producing organic esters from alcohols comprising passing an aliphatic primary alcohol over a dehydrogenation catalyst at a temperature of about 300 to about 450° C. and a superatmospheric pressure up to 300 atmospheres, an improved method for preventing the production of higher alcohol comprising adding to the said aliphatic alcohol a proportion of water ranging from about 0.5 to 5 mols. of water per mol. of alcohol.

19. In the process for producing organic esters from alcohols comprising passing an aliphatic primary alcohol with hydrogen over a dehydrogenation catalyst at a temperature of about 300 to about 450° C. and a superatmospheric pressure up to 300 atmospheres, an improved method for preventing the production of higher alcohol comprising adding to the said aliphatic alcohol a proportion of water ranging from about 0.5 to 5 mols of water per mol. of alcohol.

20. In a process for the production of oxygenated organic products involving the heating of primary alcohols in the presence of dehydrogenation catalysts at superatmospheric pressure whereby a product comprising largely aldehydes, esters and higher alcohols is obtained, an improved means of decreasing the formation of higher alcohols and increasing the proportion of aldehydes and esters in the reacting product, comprising conducting the said reaction in the presence of an effective amount of added water sufficient to give a water to alcohol molal ratio substantially greater than 0.1.

21. Process according to claim 20 in which the molal ratio of water to alcohol is between the limits of about 0.5 to 5.

22. Process according to claim 20 in which the volume ratio of water to alcohol is between the limits of 0.5 and 5 and a dehydrogenation catalyst comprising copper is used.

23. Process according to claim 20 in which the volume ratio of water to alcohol is between the limits of 0.5 and 5 and a dehydrogenation catalyst comprising copper and a promoter is used which in the presence of said catalyst promotes the formation of aldehydes and esters.

PER K. FROLICH.